United States Patent
Wolf

(10) Patent No.: US 9,731,595 B2
(45) Date of Patent: Aug. 15, 2017

(54) CLOSURE SYSTEM

(75) Inventor: Hartmut Wolf, Konigswinter (DE)

(73) Assignee: Kautex Textron GmbH & Co. KG, Bonn (DE)

( * ) Notice: Subject to any disclaimer, the term of this patent is extended or adjusted under 35 U.S.C. 154(b) by 0 days.

(21) Appl. No.: 14/128,149

(22) PCT Filed: Apr. 27, 2012

(86) PCT No.: PCT/EP2012/001812
§ 371 (c)(1),
(2), (4) Date: Mar. 31, 2014

(87) PCT Pub. No.: WO2012/175155
PCT Pub. Date: Dec. 27, 2012

(65) Prior Publication Data
US 2014/0217094 A1     Aug. 7, 2014

(30) Foreign Application Priority Data

Jun. 22, 2011 (DE) .......................... 10 2011 105 706

(51) Int. Cl.
*B65D 43/04* (2006.01)
*B60K 15/04* (2006.01)
*B60K 15/03* (2006.01)

(52) U.S. Cl.
CPC .... *B60K 15/0406* (2013.01); *B60K 15/03177* (2013.01); *B60K 15/04* (2013.01); *B60K 2015/03032* (2013.01); *B60K 2015/03046* (2013.01); *B60K 2015/03493* (2013.01); *B60K 2015/0438* (2013.01); *B60K 2015/0451* (2013.01); *B60K 2015/0496* (2013.01)

(58) Field of Classification Search
CPC .. B60K 2015/03046; B60K 2015/0451; B60K 15/0406; B60K 15/04
USPC .............. 220/804, 378, 601, 4.14; 296/97.22
See application file for complete search history.

(56) References Cited

U.S. PATENT DOCUMENTS 2,339,255 A * 1/1944 Dodson ................ B65D 39/084
                                                220/288
5,862,936 A * 1/1999 Johanson ............... B65D 39/08
                                                220/304
6,056,140 A * 5/2000 Muth et al. .............. 220/203.25
(Continued)

FOREIGN PATENT DOCUMENTS

CN        204236233 U      4/2015
DE          4206747 A1     9/1993
(Continued)

*Primary Examiner* — Shawn M Braden
(74) *Attorney, Agent, or Firm* — Grossman Tucker Perreault & Pfleger, PLLC

(57) ABSTRACT

The invention relates to a closure system on a fuel tank (2) of thermoplastics with barrier properties for hydrocarbons. The closure system comprises at least one orifice (4), with a closure cap (5) which closes the orifice (4) in a sealing manner and which cooperates in a form-fitting manner with closure means provided at the circumference of the orifice (4) and encloses at least one first sealing means between it and a tank wall (3). The closure system (1) according to the invention is distinguished in that the tank wall is sealed in the region of the orifice (4) with at least one second sealing means, which covers and/or shields a part of the tank wall surfaces exposed to hydrocarbons.

27 Claims, 2 Drawing Sheets

(56) References Cited

U.S. PATENT DOCUMENTS

Figure 1:
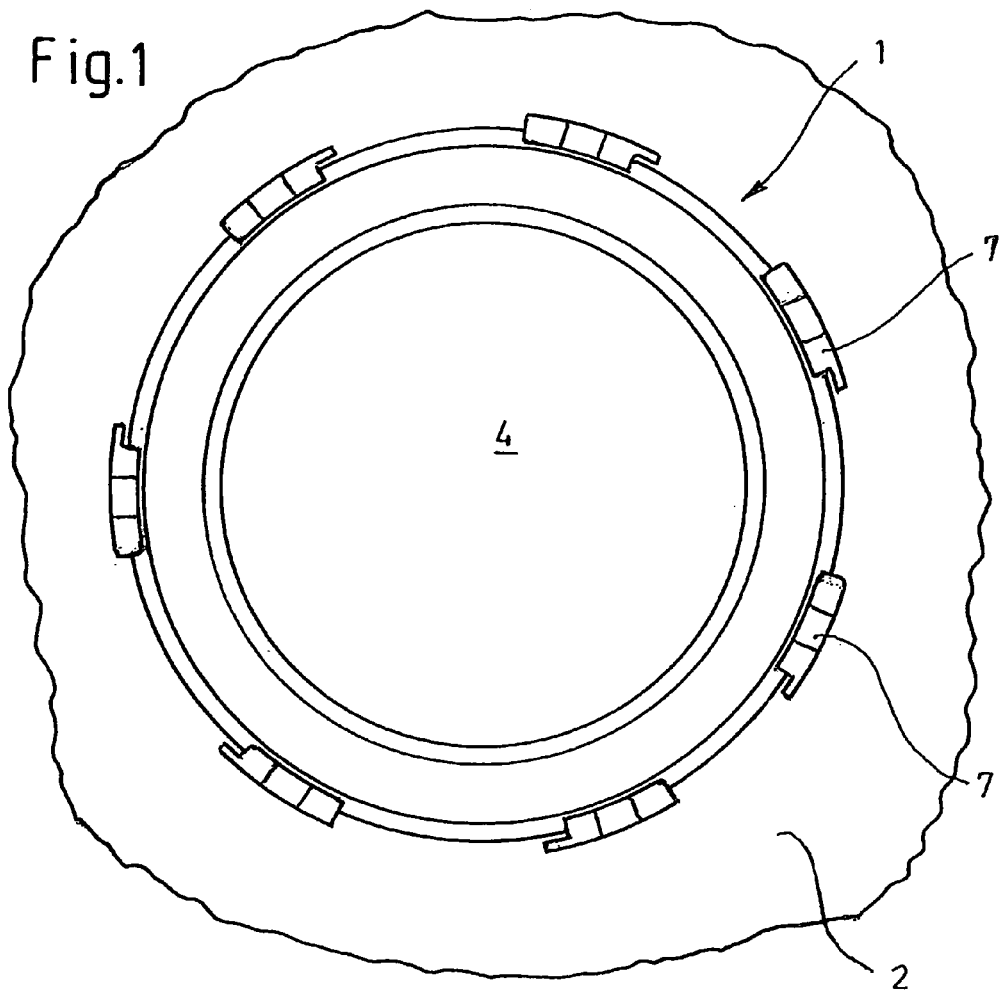

| | | | |
|---|---|---|---|
| 6,305,568 B1 * | 10/2001 | Suzuki | B60K 15/03177 |
| | | | 220/562 |
| 6,357,617 B1 * | 3/2002 | Kido | 220/562 |
| 6,698,799 B2 * | 3/2004 | Anderson | B60K 15/04 |
| | | | 285/139.1 |
| 6,844,037 B2 * | 1/2005 | Gombert | B29C 49/20 |
| | | | 156/156 |
| 7,083,065 B2 * | 8/2006 | Zdroik | F02M 37/103 |
| | | | 220/293 |
| 7,128,346 B2 * | 10/2006 | Miyajima | B60K 15/035 |
| | | | 285/201 |
| 8,622,102 B2 | 1/2014 | Yager et al. | |
| 9,132,728 B2 | 9/2015 | Heidemeyer | |
| 2002/0096522 A1 * | 7/2002 | Palvoelgyi et al. | 220/378 |
| 2002/0130515 A1 | 9/2002 | Mlyajima et al. | |
| 2003/0094456 A1 * | 5/2003 | Matsubara et al. | 220/367.1 |
| 2004/0245253 A1 | 12/2004 | Zdroik | |
| 2006/0185760 A1 | 8/2006 | Matsuzaki et al. | |
| 2007/0290414 A1 * | 12/2007 | Criel | B29C 49/20 |
| | | | 264/531 |
| 2008/0210692 A1 | 9/2008 | Fujita | |
| 2010/0024898 A1 | 2/2010 | Bansal et al. | |
| 2010/0051621 A1 | 3/2010 | Shimoda et al. | |

FOREIGN PATENT DOCUMENTS

| | | |
|---|---|---|
| GB | 2375574 A | 11/2002 |
| WO | 2005108144 A2 | 11/2005 |

\* cited by examiner

CLOSURE SYSTEM

The invention relates to a closure system on a fuel tank of thermoplastics with barrier properties for hydrocarbons, with at least one orifice and with a closure cap which closes the orifice in a sealing manner and which cooperates in a form-fitting manner with closure means provided at the circumference of the orifice and encloses at least one first sealing means between it and a tank wall.

Such closure systems on plastics fuel tanks are sufficiently well known. They are found for example in the region of fuel tank service orifices and in the region of fuel delivery modules inserted into the fuel tank. The caps closing the orifice are generally provided with passages with fuel lines and/or electrical leads. A metallic bayonet ring is conventionally moulded into the plastics fuel tank on production thereof, in the region of the orifice. Systems are also known which are provided with a flange moulded onto the tank with a union joint or a union clamp closure. The closure cap cooperates with closure means of the bayonet ring. An elastomeric sealing ring is normally inserted between closure cap and tank orifice.

Modern fuel tanks are made from HDPE-based thermoplastics, the tank wall being formed of multilayer extrudates with non-exposed barrier layers for hydrocarbons. A typical multilayer structure of the wall of a fuel tank comprises, when viewed from the inside to the outside, at least one inner layer of pure, uncoloured HDPE, at least one layer of "regrind", i.e. of recycled plastics, at least one coupling agent layer, at least one barrier layer of EVOH, a further coupling agent layer and a layer of HDPE, which is conventionally pigmented, i.e. coloured with carbon black. The coupling agent layers consist of a modified LDPE. Such tank walls have proven extremely resistant to hydrocarbons. The tank walls are multilayer-extruded and shaped into the finished fuel tank by extrusion blow moulding, thermoforming or the like. Modern motor vehicle tanks and motor vehicles have to meet the "PZEV/LEV II or LEV III" standard, this being a US standard for low-emissions vehicles which sets specific hydrocarbon emission limit values for motor vehicles and fuel tank systems.

In principle, any orifice in a fuel tank constitutes a potential leakage path for hydrocarbons, since the tank wall barrier system is interrupted in the region of orifices.

In the above-stated closure systems, although elastomeric seals are used, which seal the system effectively relative to the outside, as a result of design features hydrocarbon vapours or liquid fuel reach the seal in the region of the tank closure and thus reach a region of the tank body which lies outside the EVOH barrier of the tank wall. In the region of the orifice of the closure system, fuel is able to migrate around the EVOH barrier of the tank wall. In particular, the circumferential face of the orifice edge and regions of the orifice edge on the side of the tank wall facing away from the tank, which are surrounded by the seal, are exposed to the fuel. Hydrocarbons diffusing into the material at this point creep under the seal and escape out of the tank wall in a region beyond the seal. This does not happen in appreciable quantities, but these quantities play a decisive role in the course of overall system optimization.

Finally, the face of the circumferential orifice edge is exposed at any rate to hydrocarbons, such that hydrocarbons may enter the tank wall at the end/face.

The object of the invention is therefore that of improving a closure system of the above-mentioned type in this respect.

The object underlying the invention is achieved by a closure system on a fuel tank of thermoplastics with barrier properties for hydrocarbons, with at least one orifice and with a closure cap which closes the orifice in a sealing manner and which cooperates in a form-fitting manner with closure means provided at the circumference of the orifice and encloses at least one first sealing means between it and a tank wall, the closure system according to the invention being distinguished in that the tank wall is provided in the region of the orifice with at least one second sealing means, which covers at least a part of the tank wall surfaces exposed to hydrocarbons.

The second sealing means is particularly preferably constructed such that it covers the circumferential face of the edge of the orifice.

The second sealing means may for example take the form of a surface covering on the tank wall, which is restricted to the surface in the region of the orifice. Alternatively, the second sealing means may take the form of a surface modification of the tank wall, which is restricted to the regions of the tank wall adjoining the orifice.

Both a surface modification of the tank wall and a surface covering on the tank wall in a locally strictly delimited region of the tank wall is straightforwardly possible with little effort during finishing after production of the tank body. Provision is conveniently made for the tank wall to be modified or coated or indeed otherwise covered in that region which, when viewed in the circumferential direction of the orifice, is located inside the conventionally provided elastomeric seal.

In a preferred variant of the closure system according to the invention, provision is made for the surface covering to take the form of a coating, in particular a plasma coating or a finishing coat.

In the case of surface modification, it is sensible and convenient to produce a chemically polar surface in the region of the exposed area of the tank wall, in particular because hydrocarbons are chemically non-polar systems.

In one advantageous variant of the closure system according to the invention, provision is made for the tank wall to be treated by fluorination or sulphonation, this surface treatment being restricted to the regions of the tank wall adjoining the orifice and the tank wall additionally comprising at least one or more non-exposed barrier layers for hydrocarbons.

The closure system according to the invention may be distinguished, for example, in that the second sealing means takes the form of an elastomeric ring, preferably with a sealing skirt centred in the tank orifice. The sealing skirt may for example rest against the internally circumferential face of the tank edge. The elastomeric ring may comprise overall in cross section an angular profile with a flat, flange-like edge, which rests externally on the tank wall and preferably only covers that region of the tank wall which is located inside the regular elastomeric seal.

The sealing skirt conveniently covers the circumferential face of the edge of the orifice completely.

Alternatively or in addition, provision may be made for the closure cap to comprise a collar protruding into the tank orifice and for the collar to comprise at least one circumferential elastomeric sealing lip, which covers the circumferential face of the edge of the orifice. Provision may furthermore be made for the closure cap to be provided with a moulded-on elastomer at the bottom of a cap flange and in the region of a circumferential collar protruding into the orifice.

If the collar comprises elastomeric sealing lips, said sealing lips may be captively fastened to the closure cap.

According to the invention, one or more sealing lips may be provided, which extend for example at a distance from one another over the circumference of the collar. One or more sealing lips may for example also form a labyrinth-like sealing system.

One or more elastomeric sealing lips may for example be injection-moulded onto the closure cap. The closure cap may consist for example of polyamide, POM or ABS. Fluorine rubber materials, for example, are suitable for the elastomeric sealing lips.

The above-mentioned elastomeric ring and the sealing skirt provided thereon may also consist of a fluorine rubber material.

The closure system conveniently takes the form of a bayonet closure. It goes without saying that the closure system may also be constructed as a union joint or otherwise.

At least one bayonet ring with retaining claws, which ring is moulded into the tank wall, may be provided as the closure means. If the fuel tank is extrusion blow moulded, the bayonet ring is preferably blow moulded into the tank wall.

Figure 2:
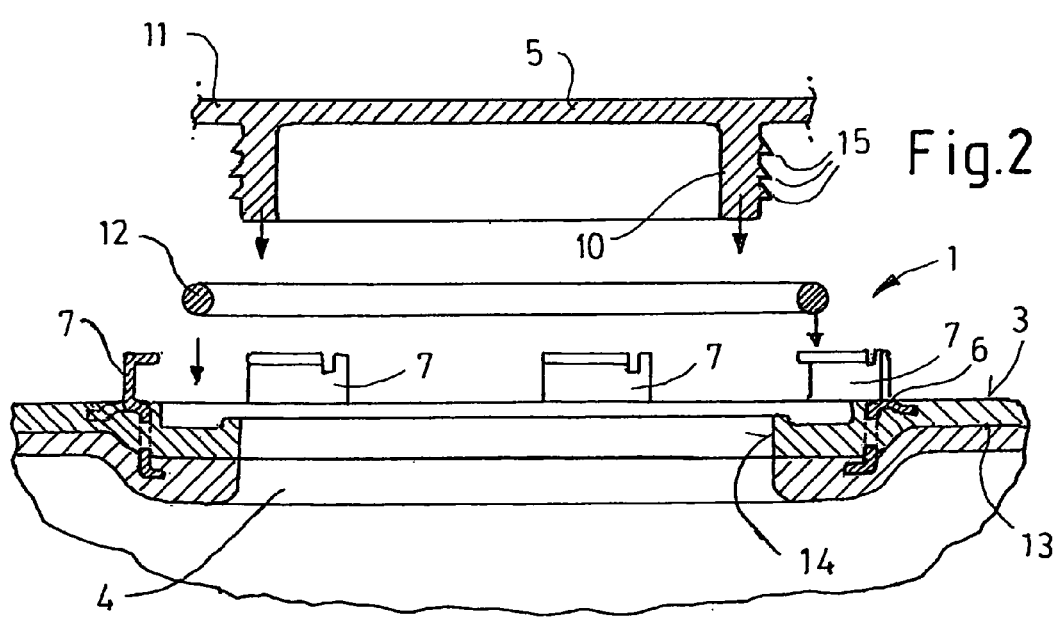
Figure 3:
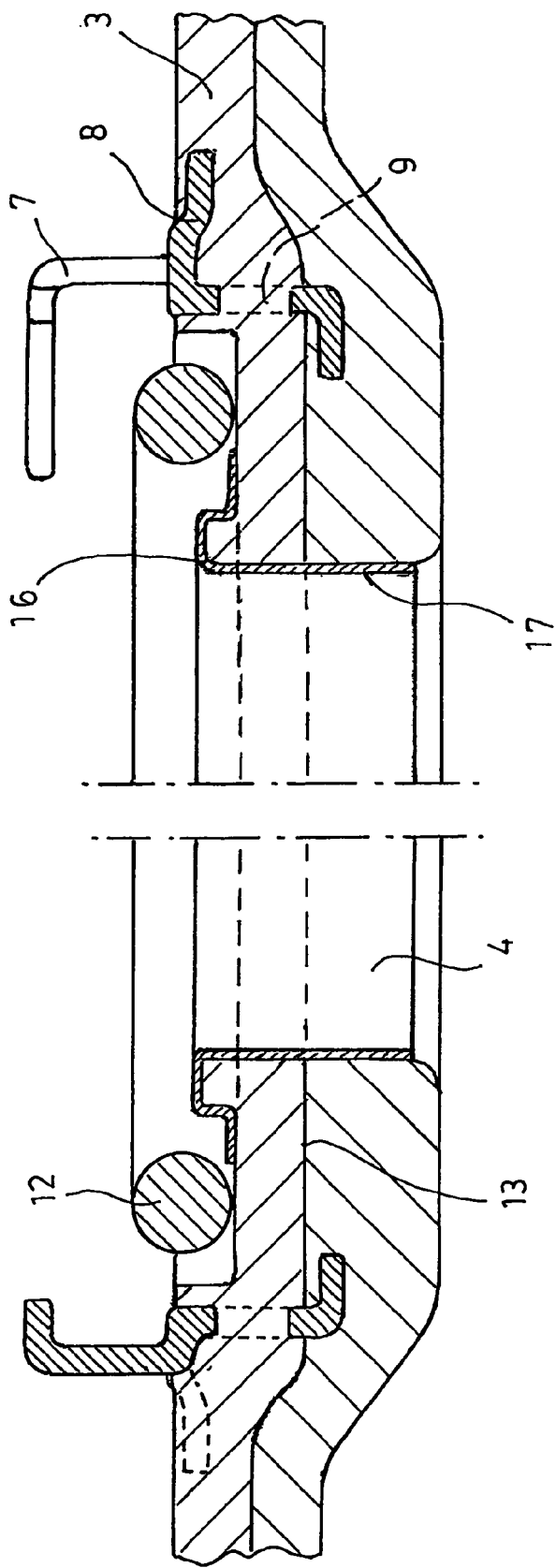

The invention will be explained below with reference to an exemplary embodiment shown in the drawings, in which:

FIG. 1 shows a plan view of the fuel tank according to the invention in the region of a service orifice, FIG. 2 shows a cross section through the closure system according to a first variant of the invention and FIG. 3 shows a cross section through the closure system according to a second variant of the invention.

The closure system 1 according to the invention is provided on a fuel tank 2 of thermoplastics, which was obtained by extrusion blow moulding or by thermoforming or by welding together injection-moulded half-shells from multi-layer plastics extrudates. The tank wall 3 of the fuel tank 2 has an at least six-layered wall structure comprising an inner HDPE layer, a recycled layer, a coupling agent layer, an EVOH barrier layer, a further coupling agent layer and an outer HDPE layer. The inner HDPE layer consists of "virgin" HDPE, the coupling agent layers of LDPE, the barrier layer for example of EVOH and the outer layer forming the outside of the tank of HDPE coloured with carbon black.

In the drawings, the multilayer structure of the tank wall 3 is shown only in a highly schematically simplified manner.

The closure system 1 comprises an orifice 4 and a closure cap 5 inserted into the orifice 4. The orifice 4 takes the form of a circle cut out of the tank wall 3 and is surrounded by a metallic bayonet ring 6 with retaining claws 7. The bayonet ring 6 comprises a flanged ring 8 moulded into the tank wall 3, which flanged ring comprises a plurality of holes 9 around its circumference, through which passes the thermoplastic material of the tank wall 3.

The bayonet ring 6 was blow moulded into the tank wall 3 by extrusion blow moulding during production of the fuel tank 2. It was inserted into the die during production and flowed through by the material of the parison on expansion of the parison in the die. A circle was subsequently cut out to form the orifice 4 after removal of the fuel tank from the die.

As is clear in particular if FIGS. 1 and 3 are looked at together, the bayonet ring 6 comprises a plurality of cross-sectionally angular retaining claws 7 arranged spacedly from one another and surrounding the closure cap 5. The closure cap 5 comprises a circumferential collar 10, the diameter of which corresponds approximately to the diameter of the orifice 4 and which is centred in the orifice 4 when inserted. When the closure cap 5 is inserted into the orifice 4, the circumferential edge 11 of the closure cap 5 rests against an elastomeric seal 12, which takes the form of an O-ring seal. The elastomeric seal 12 in this case rests on the tank wall 3 inside the region delimited by the retaining claws 7.

The barrier layer 13 for hydrocarbons, extending in the tank wall 3, is merely indicated in the drawing as a line. As is straightforwardly apparent from FIGS. 2 and 3, on the outward-facing side of the tank wall 3 the elastomeric seal 12 encloses a region of the tank wall 3 which is exposed when the closure cap 5 is inserted to hydrocarbons in the liquid or in the gas phase. The internally circumferential face 14 of the edge of the orifice 4 is likewise normally exposed. In this region, the barrier layer 13 is freely accessible or cut away.

In the variant of the closure system 1 according to the invention, which is shown in FIG. 2, the collar 10 of the closure cap 5 is provided on its side facing the face 14 with moulded-on elastomeric sealing lips 15, which, in the position in which the collar 10 is centred within the orifice 4, rest against the face 14 in such a way as to reliably prevent the penetration of hydrocarbon, whether in the gas phase or in the liquid phase, into the orifice such that the region of the tank wall 3 above the barrier layer 13 comes into contact with hydrocarbons.

A further variant of the closure system 1 according to the invention is shown in FIG. 3, the closure cap 5 not being shown for reasons of simplification. In addition to the elastomeric seal 12, a further sealing ring 16 is inserted into the orifice 4. This sealing ring has a profile which is cross-sectionally, for instance, angular and a skirt 17 projecting into the orifice 4, the length of which is somewhat greater than the wall thickness of the tank wall 3, such that the skirt 17 completely covers the face 14 of the orifice 4. When the closure cap 5 is inserted, the skirt 17 comes to lie between the collar 10 of the closure cap 5 and the face 14 of the orifice 4. As an alternative to the illustrated variants of the closure system 1 according to the invention, provision may be made for the entire surface of the tank wall 3 to be coated or surface-modified inside the region defined by the retaining claws 7, including the surface of the face 14 of the orifice 4.

LIST OF REFERENCE NUMERALS

1 Closure system
2 Fuel tank
3 Tank wall
4 Orifice
5 Closure cap
6 Bayonet ring
7 Retaining claws
8 Flanged ring
9 Holes
10 Collar
11 Edge
12 Elastomeric seal
13 Barrier layer
14 Face
15 Sealing lips
16 Sealing ring
17 Skirt

What is claimed is:
1. A fuel tank closure system, comprising:
a fuel tank to hold hydrocarbon fuel, the fuel tank having
 a tank wall of thermoplastics with a barrier layer for hydrocarbons, with at least one orifice having a circumference;

a closure cap which cooperates with a closure means of the fuel tank to cover the orifice, wherein the closure means is provided at the circumference of the orifice and configured such the closure cap is fastenable to the fuel tank;

at least one first seal enclosed between the closure cap and an outer surface of the tank wall; and at least one second seal in a region of the orifice which covers or shields a part of the tank wall exposed to hydrocarbon fuel when placed in the fuel tank;

wherein the orifice has an edge with a circumferential face defined by a cross-sectional thickness of the tank wall, and the second seal covers or shields the cross-sectional thickness of the tank wall defining the circumferential face of the edge of the orifice from exposure to the hydrocarbon fuel; and wherein the second seal comprises a surface treatment of the tank wall, which is restricted to treating the tank wall in the region of the orifice.

2. The closure system according to claim 1, wherein the second seal comprises a surface covering on the tank wall, which is restricted to covering a surface of the tank wall in the region of the orifice.

3. The closure system according to claim 2, wherein the surface covering comprises a coating.

4. The closure system according to claim 1, wherein the surface treatment comprises at least one of fluorination and sulphonation.

5. The closure system according to claim 1, wherein the second seal comprises an elastomeric ring in the orifice.

6. The closure system according to claim 5, wherein the elastomeric ring comprises a sealing skirt which covers the circumferential face of the edge of the orifice.

7. The closure system according to claim 1, wherein the closure cap comprises a collar which protrudes into the orifice and the collar comprises at least one circumferential sealing lip, which covers the circumferential face of the edge of the orifice.

8. The closure system according to claim 7, wherein the sealing lip is captively fastened to the closure cap.

9. The closure system according to claim 7, wherein the sealing lip is injection moulded onto the closure cap.

10. The closure system according to claim 1, wherein the closure system comprises a bayonet closure.

11. The closure system according to claim 1, wherein the closure means comprises at least one bayonet ring, which is moulded into the tank wall.

12. The closure system according to claim 3, wherein the coating is a plasma coating.

13. The closure system according to claim 3, wherein the coating is a finish coating.

14. The closure system according to claim 11, wherein the bayonet ring comprises a plurality of retaining claws.

15. A fuel tank closure system, comprising:
a fuel tank to hold hydrocarbon fuel, the fuel tank having a tank wall of thermoplastics with a barrier layer for hydrocarbons, with at least one orifice having a circumference;

a closure cap which cooperates with a closure means of the fuel tank to cover the orifice, wherein the closure means is provided at the circumference of the orifice and configured such the closure cap is fastenable to the fuel tank;

at least one first seal enclosed between the closure cap and an outer surface of the tank wall; and at least one second seal in a region of the orifice which covers or shields a part of the tank wall exposed to hydrocarbon fuel when placed in the fuel tank;

wherein the orifice has an edge with a circumferential face defined by a cross-sectional thickness of the tank wall, and the second seal covers or shields the cross-sectional thickness of the tank wall defining the circumferential face of the edge of the orifice from exposure to the hydrocarbon fuel;

wherein the second seal comprises a surface covering on the tank wall, which is restricted to covering a surface of the tank wall in the region of the orifice; and wherein the surface covering comprises a coating.

16. The closure system according to claim 15, wherein the second seal comprises a surface treatment of the tank wall, which is restricted to treating the tank wall in the region of the orifice.

17. The closure system according to claim 16, wherein the surface treatment comprises at least one of fluorination and sulphonation.

18. The closure system according to claim 15, wherein the second seal comprises an elastomeric ring in the orifice.

19. The closure system according to claim 18, wherein the elastomeric ring comprises a sealing skirt which covers the circumferential face of the edge of the orifice.

20. The closure system according to claim 15, wherein the closure cap comprises a collar which protrudes into the orifice and the collar comprises at least one circumferential sealing lip, which covers the circumferential face of the edge of the orifice.

21. The closure system according to claim 20, wherein the sealing lip is captively fastened to the closure cap.

22. The closure system according to claim 20, wherein the sealing lip is injection moulded onto the closure cap.

23. The closure system according to claim 15, wherein the closure system comprises a bayonet closure.

24. The closure system according to claim 15, wherein the closure means comprises at least one bayonet ring, which is moulded into the tank wall.

25. The closure system according to claim 15, wherein the coating is a plasma coating.

26. The closure system according to claim 15, wherein the coating is a finish coating.

27. The closure system according to claim 24, wherein the bayonet ring comprises a plurality of retaining claws.

* * * * *